United States Patent [19]

Shimamori et al.

[11] 4,440,707

[45] Apr. 3, 1984

[54] PROCESS FOR PRODUCING SILICON NITRIDE SINTERED PRODUCTS HAVING HIGH TOUGHNESS

[75] Inventors: Toru Shimamori; Yoshinori Hattori; Yasushi Matsuo, all of Aichi, Japan

[73] Assignee: NGK Spark Plug Co., Ltd., Aichi, Japan

[21] Appl. No.: 428,507

[22] Filed: Sep. 29, 1982

[30] Foreign Application Priority Data

Sep. 30, 1981 [JP] Japan ................... 56-155453

[51] Int. Cl.$^3$ ............................................. C04B 35/38
[52] U.S. Cl. ..................................... 264/65; 423/344; 501/97
[58] Field of Search ......................... 264/65; 423/344; 501/97

[56] References Cited

U.S. PATENT DOCUMENTS 4,127,630 11/1978 Washburn ........................... 423/344
4,351,787 9/1982 Martinengo et al. ................. 264/65

FOREIGN PATENT DOCUMENTS 56-22678 3/1981 Japan ................................. 423/344

*Primary Examiner*—James H. Derrington
*Attorney, Agent, or Firm*—Sughrue, Mion, Zinn, Macpeak, and Seas

[57] ABSTRACT

A process for producing a silicon nitride sintered product having high toughness is described, comprising blending from 97 to 57% by weight of metallic silicon powder having a maximum particle size of 25 μm or less with from 1 to 15% by weight, calculated as TiN, of a TiN powder having a maximum particle size of 20 μm or less or a powder of titanium component capable of changing into TiN during reaction sintering, and from 2 to 28% by weight of one or more components selected from the group consisting of AlN, $Al_2O_3$, $SiO_2$ and oxides of rare earth elements, molding the resulting mixture, carrying out reaction sintering in a nonoxidizing atmosphere of a nitrogen gas or a nitrogen-containing mixed gas, and thereafter resintering in the same atmosphere at a temperature of from 1,600° C. to 2,200° C.

2 Claims, No Drawings

PROCESS FOR PRODUCING SILICON NITRIDE SINTERED PRODUCTS HAVING HIGH TOUGHNESS

FIELD OF THE INVENTION

The present invention relates to a process for producing silicon nitride sintered products having high strength, high toughness, and a fibrous structure.

BACKGROUND OF THE INVENTION

Because silicon nitride sintered products are excellent in various properties such as mechanical strength, heat resistance and corrosion resistance, etc., they are used as high temperature structural materials such as for parts of gas turbines. However, silicon nitride has a poor sinterability because of having a highly covalent bonding nature and, consequently, it is difficult to obtain silicon nitride having high density and high strength.

Hitherto, processes used for production of sintered products of silicon nitride have included (1) a reaction sintering process which comprises nitriding metallic silicon, (2) a pressureless sintering process and (3) a hot pressing process which comprises sintering a silicon nitride powder together with sintering aids. However, these processes have advantages and disadvantages shown in the following Table 1.

TABLE 1

| Process | Advantage | Disadvantage |
| --- | --- | --- |
| (1) Reaction sintering process | It is possible to sinter even in the case of a product having a complicated shape. Degradation of strength hardly occurs even at high temperature. | Density is low, and strength, corrosion resistance and oxidation resistance are inferior. |
| (2) Pressureless sintering process | It is possible to sinter even in the case of a product having a complicated shape, but not as complex as in (1). Strength is superior to that of (1). | Deformation is easily caused by shrinkage during sintering. The largest amount of sintering aids is required, and consequently degradation of strength is significant at high temperature. |
| (3) Hot pressing process | Strength, oxidation resistance and corrosion resistance are excellent. | It is only possible to sinter products having a simple shape. Degradation of strength although lesser degree than (2) occurs at high temperature resulting from the addition of sintering aids. |

All of these processes have advantages and disadvantages. Therefore, none of them are completely satisfactory processes for producing high temperature structural materials having complicated shapes, such as parts for gas turbines or engines, etc. However, since the pressureless sintering process and the hot pressing process each has certain advantages, they would become desirable processes for producing the high temperature structural materials, if a method of overcoming the disadvantages while keeping the advantages of each could be found out. Thus, various processes have been proposed hitherto. One of them is a process which comprises sintering a silicon nitride powder together with from 0.1 to 40% by weight of one or more components selected from titanium nitride and tantalum nitride. (Japanese Patent Application (OPI) No. 123113/79 (the term "OPI" as used herein refers to a "published unexamined Japanese patent application").) However, in this process, hot pressing which has the above mentioned disadvantages is necessary to obtain a fully dense products.

SUMMARY OF THE INVENTION

The present inventors have conducted extensive studies on sintering aids to be added in obtaining dense sintered products which are made by combining a reaction sintering and resintering processes. As a result, it has now been found that, when sintered products obtained by reaction sintering of a metallic silicon powder to which titanium nitride and certain kinds of oxides, including oxides of rare earth elements, are added in specified amounts, respectively, and are then subjected to resintering, the resulting products do not undergo degradation of strength at a high temperature and are remarkably excellent as high temperature structural materials.

More particularly, the present invention relates to a process for producing silicon nitride sintered products having high toughness, comprising blending from 97 to 57% by weight of metallic silicon powder having a maximum particle size of 25 $\mu$m or less with from 1 to 15% by weight, calculated as TiN, of a TiN powder having a maximum particle size of 20 $\mu$m or less or a powder of titanium component capable of changing into TiN during reaction sintering, and from 2 to 28% by weight of one or more components selected from the group consisting of AlN, $Al_2O_3$, $SiO_2$ and oxides of rare earth elements, molding the resulting mixture, carrying out reaction sintering in a nonoxidizing atmosphere of a nitrogen gas or a nitrogen-containing mixed gas, and thereafter resintering in the same atmosphere at a temperature of from 1,600° to 2,200° C.

DETAILED DESCRIPTION OF THE INVENTION

In the illustrations of the present invention presented in detail hereinafter, a metallic silicon powder is used in the present invention as a starting raw material to which sintering aids are added, and the mixture is subjected first to reaction sintering to obtain a reaction sintered product. The reason why silicon nitride is not used as a starting raw material like the above described prior processes is as follows:

(1) It is possible to produce a dense product while reducing the amount of sintering aids, because the density before sintering in the case of resintering the reaction sintered product according to the present invetion is higher than that in case of molding $Si_3N_4$ powder together with sintering aids and sintering it.

(2) It is important to uniformly disperse TiN in the $Si_3N_4$ sintered product in the prior processes. From this point of view, the process which comprises blending the Si powder with the TiN powder, molding the resulting mixture and carrying out reaction sintering and then resintering is remarkably superior to the process which comprises blending the $Si_3N_4$ powder with the TiN powder, molding the resulting mixture and sintering it.

To the metallic silicon powder which is the starting raw material, TiN powder and one or more sintering aids selected from AlN, Al$_2$O$_3$, SiO$_2$ and oxides of rare earth elements are added.

The TiN serves to increase toughness by inhibiting grain growth in the sintered product and increase the aspect ratio (length of fiber/diameter) of particles and increase high temperature strength by uniformly dispersing between particles of silicon nitride to improve the properties of the grain boundary phase. Therefore, it is possible to add a powder of titanium components capable of changing into TiN during the reaction sintering, such as metal Ti or titanium hydride, etc., instead of the TiN powder. However, other sintering aids should be added additionally, because dense products cannot be obtained by adding only the TiN powder if hot pressing treatment is not carried out. Sintering aids to be added should be those which do not adversely affect the above described effect of the TiN added. As a result of various experiments by the present inventors, it has been found that such sintering aids are selected from the group consisting of AlN, Al$_2$O$_3$, SiO$_2$, and oxides of rare earth elements.

In the present invention, the metallic silicon powder must necessarily have a maximum particle size of 25 μm or less, because the maximum diameter of pores in the sintered products after reaction sintering depends upon the maximum particle size of the raw material powders. If the maximum particle size is larger than 25 μm, large pores remain in the products after resintering, which is a severe fault in the final resulting sintered products.

Further, the TiN powder must necessarily have a maximum particle size of 20 μm or less. If the particle size is over 20 μm, the powder cannot be dispersed uniformly, and the desirable effects of TiN being added are not exhibited. The sintering aids such as AlN, etc., have preferably a maximum particle size of 10 μm or less.

Still further, the above described raw materials must necessarily be used in the amounts of from 97 to 57% by weight of the metallic silicon powder, from 1 to 15% by weight of the TiN powder or the powder of titanium components capable of changing into TiN during the reaction sintering, and from 2 to 28% by weight of one or more sintering aids selected from AlN, Al$_2$O$_3$, SiO$_2$ and oxides of rare earth elements. If the amount of TiN, etc., is lower than 1% by weight, the effect of improving the high temperature strength and toughness is not exhibited, and, if it is over 15% by weight, strength at room temperature deteriorates. If the amount of sintering aids such as AlN, etc., is lower than 2% by weight, not only does the sinterability upon resistering deteriorate, but also the structure of the sintered products becomes difficult to change into a fibrous structure which is necessary for high strength and toughness. If it is over 28% by weight, though the sinterability in resintering is improved, the strength at high temperature of the resulting sintered products degrade remarkably.

The above described raw materials are blended and ground by a ball mill, etc., and the resulting mixture is molded into a desired shape. The moldings are subjected first to reaction sintering by carrying out a nitriding reaction at a temperature of from 1,200° to 1,450° C. in a nonoxidizing atmosphere of a nitrogen gas or a mixed gas composed of nitrogen and ammonia, inert gas or hydrogen, etc. In this case, if the temperature is lower than 1,200° C., unreacted metallic silicon remains. If it is higher than 1,450° C., the proportion of β phase in the formed silicon nitride becomes large, and, consequently, the particles of the sintered products obtained by resintering become rough and the aspect ratio of particles becomes low. Further, the atmosphere in the nitriding reaction may have a pressure of 1 atmospheric pressure or more.

After reaction sintering, the resulting product is necessarily resintered in order to form dense products having a fibrous structure. Resintering is carried out at a temperature of from 1,600° to 2,200° C. in a nonoxidizing atmosphere such as a nitrogen gas or a mixture of nitrogen and an inert gas. When the temperature is lower than 1,600° C., the internal structure does not become fibrous and improvement of strength is not observed, even if the sintering aids are added. Further, a temperature higher than 2,200° C. is not necessary, because such a temperature is not industrially useful, and the properties of the resulting sintered products would not be improved thereby. The resintering is preferably carried out under a pressure of from 1 to 3,000 atm. If the pressure is lower than 1 atm, silicon nitride is easily volatilized and decomposed in the case of sintering at higher than 1,850° C. Accordingly, in order to prevent decomposition, a pressure of 1 atm or more is preferred. The pressure higher than 3,000 atm is not suitable industrially from the viewpoints of apparatus and safety. In the case of carrying out resintering at from 500 to 3,000 atm, though resintering may be carried out directly when the sintered products, before resintering, do not have opened pores, it is preferred to carry out resintering after the surface thereof is covered completely with silica glass, etc., because there is a possibility of loss of denseness if resintered directly in the case of having opened pores. Further, in case of carrying out resintering at from 1 to about 500 atm, sintering may be carried out without covering the surface, even in case of having opened pores. Further, the above described resintering step may be carried out continuously after the above described reaction sintering step, or may be carried out separately.

As described above, the process of the present invention is characterized by adding a TiN powder and sintering aids such as AlN, etc., to a metallic silicon powder, carrying out reaction sintering of the resulting mixture and carrying out resintering. Accordingly, it is possible to produce silicon nitride sintered products having high strength and high toughness and a complicated shape by the synergistic effect of the TiN powder and AlN, etc., and the produced sintered products can be used as parts of gas turbines, parts of diesel engines, cutting tools, etc.

In the following, the present invention is illustrated in greater detail by examples, but the present invention is not limited th the examples.

EXAMPLE 1

A TiN powder having an average particle size of 2 μm and a maximum particle size of 10 μm and sintering aids having an average particle size of from 0.1 to 5 μm as described in Table 2 as Sample Nos. 1–16 were added to an Si powder having an average particle size of 1 μm and a maximum particle size of 10 μm, and blended therewith. After molding the resulting mixture with isostatic press at a pressure of about 2,000 kg/cm$^2$, the resulting moldings were subjected to reaction sintering at a temperature up to 1,450° C. in a nitrogen atmosphere and thereafter resintering at a temperature of from 1,600° to 2,200° C. in a nitrogen atmosphere. Properties of the resulting sintered products were measured. Results are shown in Table 2. The flexural strength was measured using a test sample of 4×8×25 mm (span 20 mm) by 3-point bending according to JIS B-4104-1970, and the value of fracture toughness ($K_{IC}$) was measured by a notched beam method according to the ASTM SPECIAL TECHNICAL PUBLICATION NO. 410, using a test sample of 4×5×25 mm (span 20 mm) wherein a notch of 0.5 mm was formed by a diamond wheel.

In Sample No. 15 in Table 2, a TiN powder having a maximum particle size of 10 μm and an average particle size of 2 μm and a $Y_2O_3$ powder having an average particle size of 0.5 μm were added to an Si powder having an average particle size of 5 μm and a maximum particle size pf 50 μm. In Sample No. 16, a TiN powder having an average particle size of 5 μm and a maximum particle size of 50 μm and a $Y_2O_3$ powder having an average particle size of 0.5 μm were added to an Si powder having an average particle size of 1 μm and a maximum particle size of 10 μm. Operations after that were the same as those in Sample Nos. 1–14.

While the invention has been described in detail and with reference to specific embodiments thereof, it will be apparent to one skilled in the art that various changes and modifications can be made therein without departing from the spirit and scope thereof.

What is claimed is:

1. A process for producing a silicon nitride sintered product having high toughness comprising blending from 97 to 57% by weight of metallic silicon powder having a maximum particle size of 25 μm or less with from 1 to 15% by weight, calculated as TiN, of a TiN powder having a maximum particle size of 20 μm or less or a powder of titanium component capable of changing into TiN during reaction sintering, and from 2 to 28% by weight of one or more components selected from the group consisting of AlN, $Al_2O_3$, $SiO_2$ and oxides of rare earth elements, molding the resulting mixture, carrying out reaction sintering in a nonoxidizing atmosphere of a nitrogen gas or a nitrogen-containing mixed gas, and thereafter resintering in the same atmosphere at a temperature of from 1,600° to 2,200° C.

2. A process for producing a silicon nitride sintered product having high toughness according to claim 1, wherein resintering is carried out under a pressure of from 1 to 3,000 atm.

TABLE 2

| Sample No. | Amount of Si (wt %) | Amount of TiN (wt %) | Kind and Amount of Sintering Aids (wt %) | | Relative Density of Sintered Product after Reaction Sintering (%) | Temperature (°C.) | Atmosphere | Pressure (atm) | Flexural Strength at Room Temperature (kg/mm²) | Value of Fracture Toughness ($K_{IC}$) (kg/mm²) | Note |
|---|---|---|---|---|---|---|---|---|---|---|---|
| 1 | 81 | 1 | $Y_2O_3$ | 18 | 75 | 2,050 | $N_2$ | 80 | 102 | 23 | Present invention |
| 2 | 67 | 15 | $Y_2O_3$ | 18 | 77 | 2,050 | $N_2$ + Ar (1:1) | 80 | 96 | 30 | Present invention |
| 3 | 86 | 7 | $Y_2O_3$ | 7 | 73 | 1,800 | $N_2$ | 2,000 | 76 | 28 | Present invention |
| 4 | 77 | 5 | $Y_2O_3$ | 18 | 79 | 2,050 | $N_2$ | 100 | 85 | 29 | Present invention |
| 5 | 86 | 7 | $CeO_2$ | 7 | 78 | 1,800 | $N_2$ | 1,000 | 75 | 26 | Present invention |
| 6 | 85 | 5 | $CeO_2$ | 10 | 74 | 2,100 | $N_2$ | 100 | 77 | 27 | Present invention |
| 7 | 75 | 3 | $Y_2O_3$ $Al_2O_3$ | 14 8 | 76 | 1,750 | $N_2$ | 1 | 90 | 25 | Present invention |
| 8 | 79 | 3 | $Y_2O_3$ $Al_2O_3$ | 17 1 | 77 | 2,000 | $N_2$ | 80 | 92 | 24 | Present invention |
| 9 | 81 | 3 | $CeO_2$ $Al_2O_3$ | 14 2 | 74 | 1,850 | $N_2$ | 20 | 95 | 25 | Present invention |
| 10 | 69 | 3 | $Y_2O_3$ AlN $SiO_2$ | 14 12 2 | 76 | 2,000 | $N_2$ | 80 | 87 | 23 | Present invention |
| 11 | 85 | 0 | $Y_2O_3$ | 15 | 76 | 2,050 | $N_2$ | 80 | 90 | 18 | Comparative Example |
| 12 | 65 | 20 | $Y_2O_3$ | 15 | 73 | 2,050 | $N_2$ | 80 | 60 | 22 | Comparative Example |
| 13 | 94.5 | 5 | $Y_2O_3$ | 0.5 | 78 | 2,000 | $N_2$ | 80 | 40 | 15 | Comparative Example |
| 14 | 60 | 5 | $Y_2O_3$ | 35 | 77 | 2,000 | $N_2$ | 80 | 56 | 17 | Comparative Example |
| 15 | 77 | 5 | $Y_2O_3$ | 18 | 78 | 2,050 | $N_2$ | 100 | 58 | 21 | Comparative Example |
| 16 | 77 | 5 | $Y_2O_3$ | 18 | 79 | 2,050 | $N_2$ | 100 | 63 | 20 | Comparative Example |

As can be seen from Table 2, although comparative examples may alternatively achieve satisfactory bending strength or breaking toughness, the process of the present invention provides both satisfactory bending strength and breaking toughness simultaneously.

* * * * *